United States Patent [19]

Stemme et al.

[11] 4,368,484

[45] Jan. 11, 1983

[54] DEVICE FOR COLOR SCANNING WITH CCD ARRAY

[75] Inventors: Otto Stemme, Munich; Eduard Wagensonner, Aschheim, both of Fed. Rep. of Germany

[73] Assignee: Agfa-Gevaert AG, Leverkusen, Fed. Rep. of Germany

[21] Appl. No.: 223,721

[22] Filed: Jan. 9, 1981

[30] Foreign Application Priority Data

Feb. 8, 1980 [DE] Fed. Rep. of Germany ....... 3004717

[51] Int. Cl.³ .............................................. H04N 9/02
[52] U.S. Cl. ...................................... 358/41; 358/75; 358/332

[58] Field of Search ..................... 358/54, 75, 78, 213, 358/127, 130, 41, 44, 6

[56] References Cited

U.S. PATENT DOCUMENTS 4,303,936 12/1981 Shaw ................................ 358/75 X Primary Examiner—Robert L. Richardson
Attorney, Agent, or Firm—Michael J. Striker

[57] ABSTRACT

An apparatus is disclosed for electronically scanning photographic positives or negatives and reproducing them as video images. These images are displayed on a video monitor and may, if desired, be copied onto photosensitive paper.

12 Claims, 7 Drawing Figures

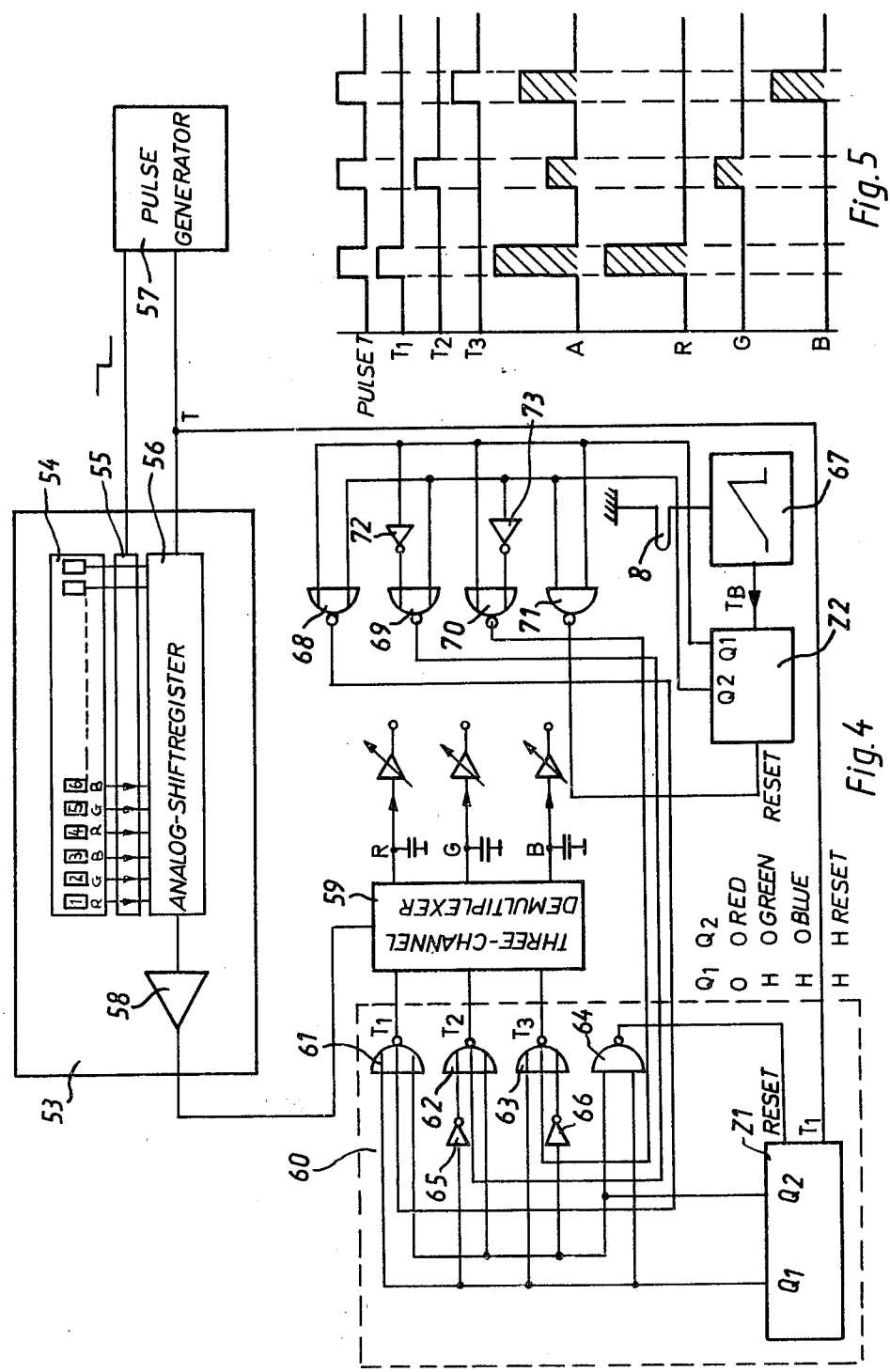

DEVICE FOR COLOR SCANNING WITH CCD ARRAY

BACKGROUND OF THE INVENTION

This invention relates to a device for electronic scanning, and more particularly to a device for electronically scanning optical depictions and converting the scan results into video images.

Among the disadvantages of the current video-related state of the art is that video images do not offer satisfactorily high resolution, and that the user is unable to obtain a permanent (i.e., "paper") picture of a video image. Both of these aspects are desirable, but neither of them has heretofore been properly addressed.

SUMMARY OF THE INVENTION

Accordingly, it is an object of the present invention to provide a device which is capable of producing high-resolution video pictures and of permitting the selective reproduction of the picture on light-sensitive photographic paper or film material.

Another object of the invention is to provide a device of the type under discussion, which can electronically scan optical depictions—such as e.g., negative or positive still film—and convert the film image(s) into video image(s).

The picture frequency of each recorded picture is to be small, as compared to the 25 cycle television picture frequency.

A user is—at least prior to reproduction (copying) of a video image on photographic paper or film material—to be enabled to view the image to be copied on a monitor, so that he may make necessary or desirable adjustments in brightness, contrast and color before initiating the copying process.

Pursuant to the invention these objects, and still others which will become apparent hereafter, are met in a device which, briefly stated, scans the optically reproduced subject matter with an opto-electronic converter in form of a CCD array having a number of red, green and blue-sensitive photo diodes in a number which assures high resolution as compared to the resolution of ordinary video images. An optical deflecting system, preferably a mirror system, reproduces the picture to be converted to a video image, linewise on the CCD array with a predetermined frequency which is very small relative to the video image frequency. The CCD array is connected with a shift register which effects linewise advancement of the image signals out of the CCD array and is clocked by an oscillator. The line clocking frequency is greater than the mirror system frequency by at least the factor of the number of video-image lines (625 in the German system). The CCD array is followed by signal processing stages from which signals are supplied to the video-monitor picture tube at the same pulse frequency as the image point frequency, and the monitor has a video image storage device which always skips one image point and stores and reproduces (on the monitor screen) at most every second image point.

According to a further embodiment, the reproducing device for the video film may have three color image tubes each associated with one of the primary colors red (R), green (G) and blue (B), in which case all three are simultaneously activated for each picture by a gate circuit. Alternatively, a single black-white image tube may be provided; in this case, a red, green and blue filter are sequentially moved in front of this tube for each picture for the duration of a picture scan and synchronously with the same. The RGB signals are then separated imagewise by a time-demultiplexer stage which is clocked at the picture scanning rate.

An image-point storage device may be connected subsequent to the CCD array and shift register. Image-point signals are then read linewise into this device and can be called up again in the same linewise manner. Each of the primary colors red, green and blue has its own channel associated with it.

A phase reversing circuit, preferably composed of inverter stages, may be provided for reproducing and copying of negative optical images, e.g., film negatives.

To permit contrast corrections it is advantageous if the CCD array is followed by a $\gamma$-type balancing stage, and to increase the steepness of the flanks of the transmission pulses a crisping stage may be provided subsequent to the CCD array.

The CCD array may be connected with a black-level detector by way of a red/blue/green matrix. This detector may control a DC motor via a reference amplifier, and the motor in turn may operate a diaphragm so as to regulate the passage of light from a light source to the object to be electronically scanned and reproduced. Advantageously, the output of the reference amplifier will be connected with a logic element which energizes the video tube or tubes for a predetermined time interval via a gating stage arrangement, when a starting signal is given.

If a black-and-white video tube is used, it should be provided with red, green and blue filters which are alternately movable in front of it during each picture scan. A digital counter will then be provided, having a clocked input which is connected to an oscillator the frequency of which equals the swing frequency of the deflecting-mirror system. The outputs of the counter are connected via three gates with the three color channels, in such a manner that red image signals, green image signals and blue image signals are sequentially transmitted for each image. The gates are advantageously NOR-gates and the counter a 2-bit digital counter. The first output of the counter is directly connected with the first input of the first and of the third NOR-gate; it is also connected, but via an inverter, with the first input of the second NOR-gate. The second output of the counter is directly connected with the third inputs of the first and of the second NOR-gates, and is connected via an inverter with the third input of the third NOR-gate. A NAND-gate is connected to both outputs of the counter and also with the resetting input of the same. The clocking input of the counter is connected with the picture-frequency oscillator. A second combination of these elements is connected in the same circuit configuration as just described; the 2-bit digital counter of this second combination is connected with an image clock-pulse generator and the NOR-gates of the second combination each have a third input which is connected with the output of the corresponding NOR-gate of the first combination.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 4-7 are circuit diagrams, illustrating a second embodiment of the invention.

DESCRIPTION OF THE PREFERRED EMBODIMENTS

FIGS. 1-3

Figure 1:
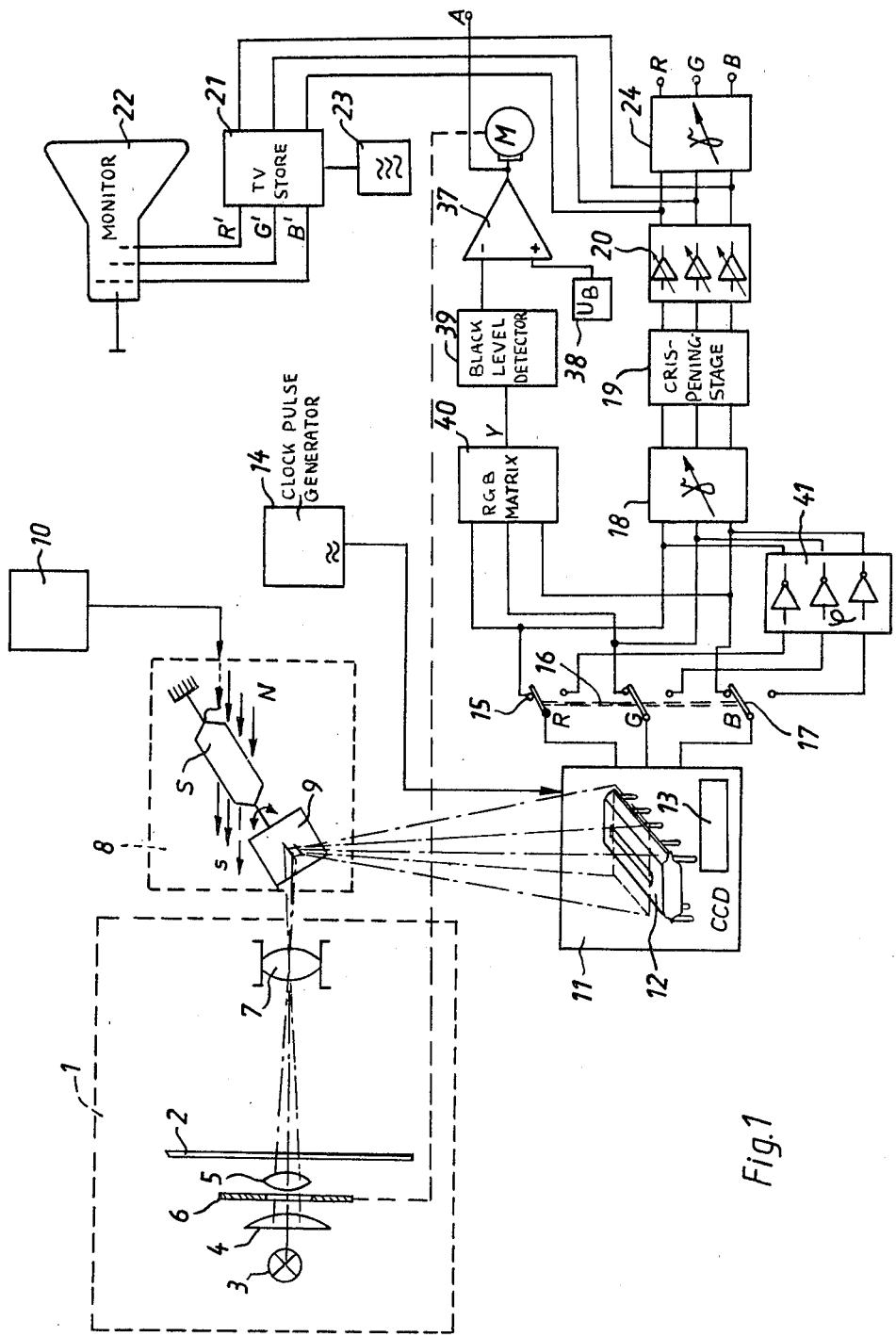
FIGS. 1-3 are circuit diagrams illustrating a a first embodiment of the invention.
Figure 2:
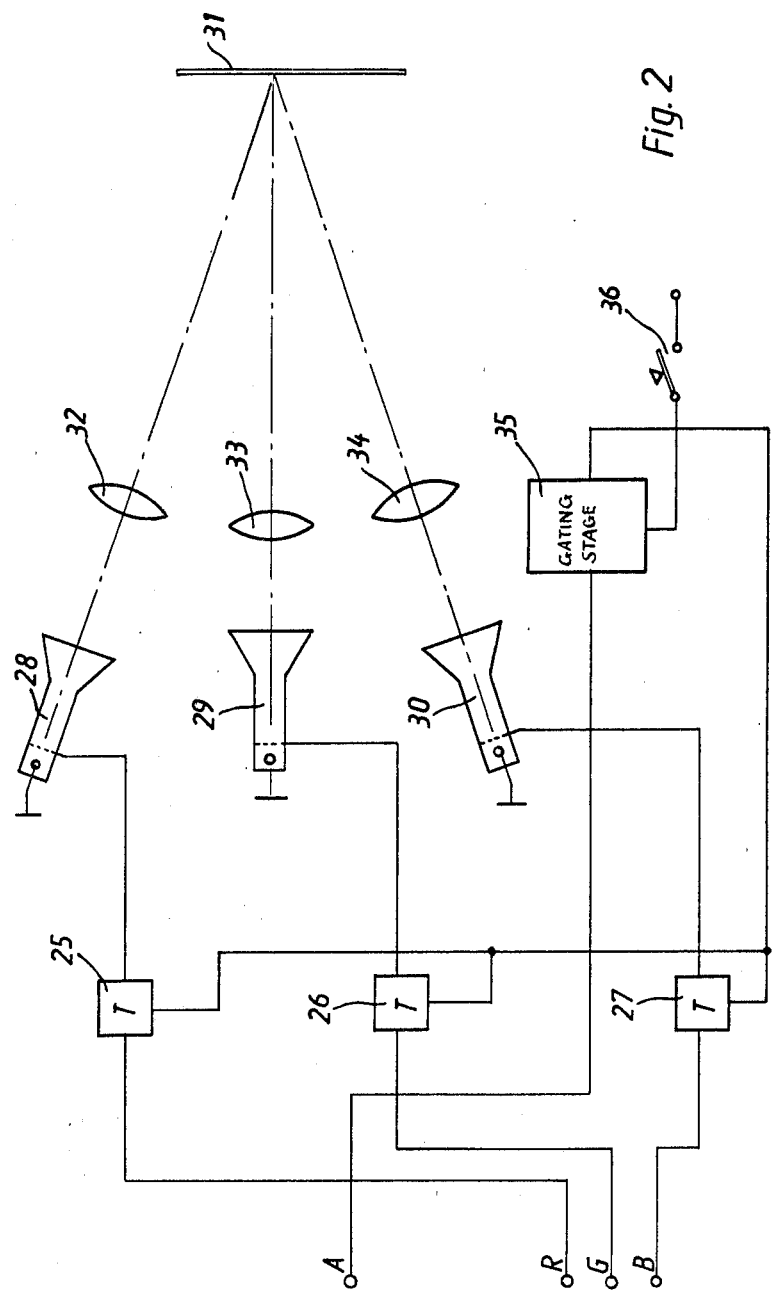
Figure 3:
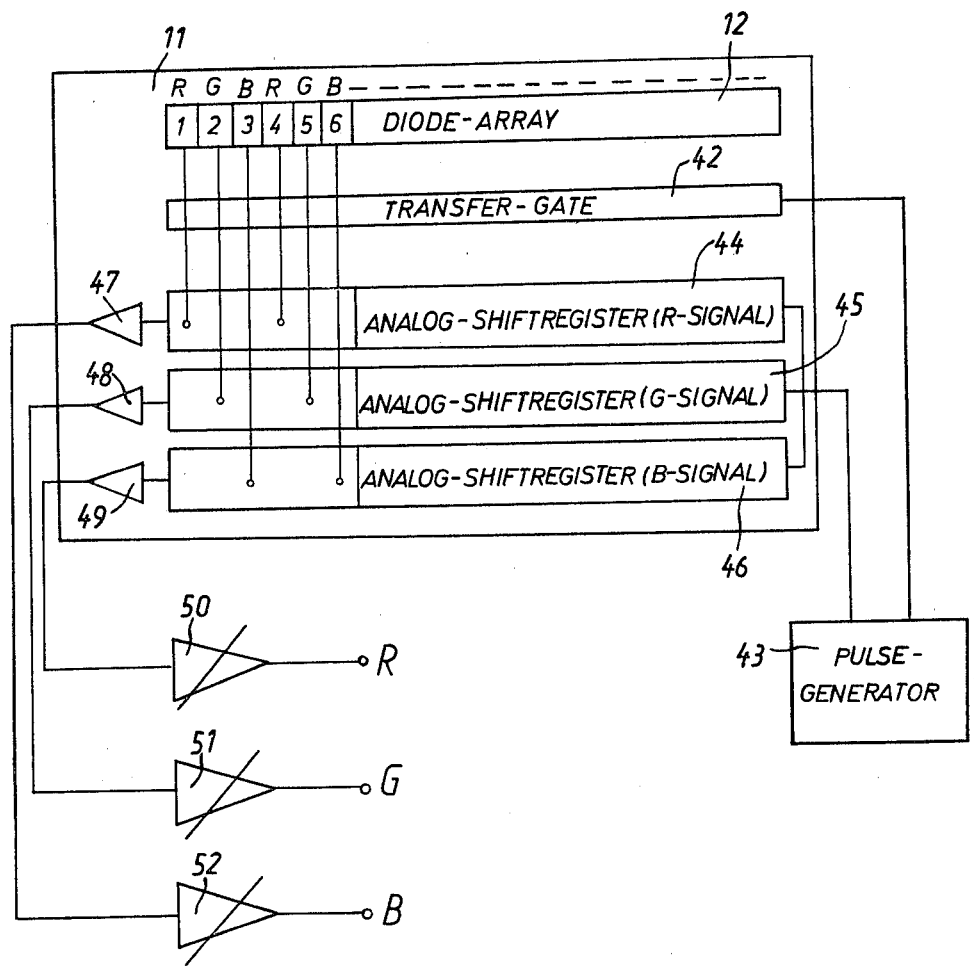

A first embodiment of the invention is illustrated in FIGS. 1-3. Reference numeral 1 designates a device for receiving and projecting a negative or positive still film picture 2. A light source 3 and optical elements 4, 5 are located at one side of the film 2 and serve to direct a light beam against it via a diaphragm that is located between the elements 4 and 5. Located at the other side of the film 2 is a further optical element 7 which focusses the light beam after the same has passed through the film 2.

Arranged beyond the element 7 is a known-per-se swing-mirror system which includes a loop oscillator S and a swing mirror 9. A generator 10 drives the oscillator S with a periodicity (preferably on the order of one second) which is large as compared to the periodicity of a video image. The mirror 9 is mounted to swing between one position in which it deflects the optical light beam from film 2 and element 7 to a CCD device (charge-coupled-device) 11, and another position in which it does not deflect the beam to that device.

The CCD device 11 includes a CCD-array 12 (these are known per se) and a shift register unit 13. A clock pulse generator 14 is connected with the device 11. The individual image points of the array 12 are shifted out of the same via shift register unit 13, in accordance with the clock pulses of generator 14. The device 11 has a first output channel R for the color red, a second output channel G for the color green, and a third output channel B for the color blue. The channels R, G and B are connected via switches 15, 16 and 17 to a γ-balancing stage 18 which serves to effect contrast corrections, in order to obtain so-called density linearity.

Arranged in circuit after the balancing stage 18 is a crispening stage 19. This is an arrangement which at limited band width permits the flanks of transmitted pulses to be made steeper, without thereby increasing the bandwidth of the amplifier path. A correcting signal is derived from the input signal and is added to the output signal. The correcting signal is such that it causes the flanks of the pulses to become steeper.

Located subsequent to the crispening stage 19 is an amplifying unit 20 from which for each color channel R, G and B a line leads to a video store 21, the outputs R', G' and B' of which are connected to a color-monitor video tube 22. An oscillator 23 clocks the video store 21 and has a pulse frequency which is so selected that the image displayed on the monitor 22 is substantially flicker-free. To avoid having to use a video store with too many storage locations, only every fourth image point pulse of the ones furnished by the CCD-array 12, is actually utilized. It is advantageous to use a CCD-array 12 having 1700 to 2000 picture points; in that case, half of the picture points is used for the brightness signal; the remaining picture points are equally divided for the colors red and blue. The green-color signal is derived from the brightness signals. The γ-balancing stage 18 primarily serves to linearize the gray value for the monitor.

Also, the outputs of the amplifying units 20 are respectively connected with a further γ-balancing stage 24 which in turn has outputs R, G and B that are connected to gating stages 25, 26 and 27. The outputs of the gating stages 25-27 are connected with control grids of respective color video tubes 28, 29 and 30. Tube 28 issues red signals, tube 29 green signals and tube 30 blue signals. These tubes project, via interposed optical elements 32, 33 and 34, a color picture onto photosensitive paper 31, so that a user may obtain a print of any desired image being reproduced in the device. The γ-balancing stage 24 services to linearize the gray value of the tubes 28-30.

The inputs of the gate stages are jointly connected with a gating circuit 35 having one input which is connected with a switch 36. Another input of stage 35 is connected via terminal A with the output of an operation amplifier 37. This assures that the gating circuit 35 will become conductive only at a certain signal magnitude, to pass a starting impulse from the switch 36 to the gating stages 25-27.

The non-inverting input of operational amplifier 37 is connected with a reference-voltage source 38; the inverting input is connected with the output of a black-level detector 39 whose input is connected with the output Y of a red-green-blue (RGB) matrix 40. The matrix 40 has three inputs which are connected with the corresponding outputs of the CCD device 11 via the respective switches 15-17.

If the film 2 is a negative, rather than a positive, the switches 15-17 are moved from the illustrated position to their alternate second position, in which a phase reversing stage becomes operative for each channel RGB. This phase reversal produces image point signals which are phase shifted by 180 degrees (complementary image point signals).

FIG. 3 shows that the CCD device 11 has a CCD photo-diode array which is provided with alternatingly arranged red, blue and green-sensitive photo-diodes. Connected subsequent to the array 12 is a transfer gate 42 which in turn is connected with a pulse generator 43. Three analog shift registers 44, 45 and 46 are provided. Each of these receives, via the transfer gate 42, only the signals of image sensor elements or photo-diodes having like color sensitivity. In other words: the red-sensitive photo-diodes are all associated with one of the three shift registors, the green-sensitive ones with another, and the blue-sensitive ones with a third shift register. The transfer gate 42 transfers the photo-diode charges parallel and simultaneously to all points of the shift register. When the charges are shifted out of the three analog shift registers 44-46, the same pulse frequency (image point frequency) is used, so that the color signals R, G and B are already available in parallel at the three outputs of the CCD device 11. In other words: these signals can be immediately furnished to the signal-processing and video reproduction device which is known from the art. The output amplifiers are identified in the drawing with reference numerals 47, 48, 49, 50, 51 and 52.

FIGS. 4-7

These Figures illustrate a second embodiment of the invention, in which the CCD device is identified with reference numeral 53. The image sensing system obtains color signals by a time-demultiplexer circuit.

In this embodiment, the CCD device 53 has a photo-diode array 54 which is connected to an analog shift register 56 via a transfer gate 55. Clocking is effected via a pulse generator 57. A charge amplifier 58 is located in the output current circuit of the analog shift register 56. A serial color signal A appears at the output of amplifier 58 and contains all color components of each image point. This signal A is supplied to a three-channel demultiplexer 59 having three outputs at which the separate color signals R, G and B are respectively available.

The demultiplexer 59 is controlled via an associated decoding logic 60 which contains a 2-bit digital counter Z1, NOR-gates 61, 62 and 63, and a NAND gate 64. The first output Q1 of counter Z1 is directly connected with the first input of NOR-gate 61, with the first input of NOR-gate 63 and with the first input of NAND-gate 64; output Q1 is also connected, via an inverter 65, with the first input of NOR-gate 62. The second output Q2 of counter Z1 is directly connected with the third input of NOR-gate 61 and the third input of NOR-gate 62, as well as with the second input of NAND-gate 64; output Q2 is also connected, via inverter 66, with the third input of NOR-gate 63. The output of NAND-gate 64 is connected with the reset input of the counter Z1, and the clocking input T1 of counter Z1 is connected with the pulse generator 57. The outputs of the NOR-gates 61-63 are connected with the three-channel demultiplexer 59.

The light-sensitive part of the CCD device 53 is composed of the already mentioned photo-diode array 54 which may, for example, have 1800 silicone diodes arrayed in a row at a raster spacing of e.g., 13μ. The overall width of the array is about 24 mm.

Figure 6:
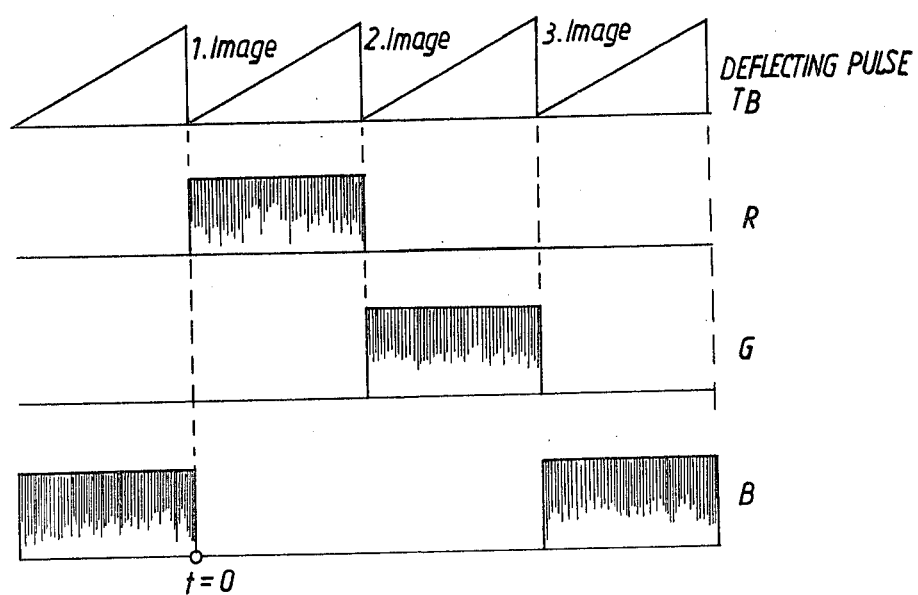

FIG. 6 shows that if, for example at the time t=0, the first line of the picture is reproduced on the diode array 54, then the transfer gate 55 is briefly made conductive by a pulse flank and the stored brightness signal (each image sensor element of the diode array 54 is connected with a storage capacitor) is transmitted in parallel to the analog shift register 56. From this time on, the clock pulses T effect outward shifting of the signal stored in shift register 56, so that it is available via the charge amplifier 58 at the output of the CCD device 53. The frequency of the clock pulses T is so selected that, assuming 1800 image points in the CCD-array 54 and 1500 lines—an image frequency of e.g. one second is obtained.

A serial color signal A, which alternatively contains the red, green and blue components of each image point in a repetitive series of three, is available at the output of device 53, as already mentioned. Via the three-channel demultiplexer 59 and the associated decoding logic 60, this signal A is converted into the parallel color signals R, G and B. Details of the clock pulses and of the signals at the terminals T1, T2 and T3, as well as in the conductors A, R and B, are shown in FIG. 5.

In addition, this embodiment includes a second counter 22 which is the same as counter Z1, i.e., another 2-bit digital counter. The counter 22 is controllable by a pulse generator 67 whose input is connected with the swing-mirror system 8 (which is the same as in FIGS. 1-3). The frequency of the pulse generator 67 is therefore equal to the image frequency.

The outputs Q1 and Q2 of the counter Z2 are connected with NOR-gates 68, 69 and 70, in the same manner as in the case of counter Z1. A NAND-gate 71 of counter Z2 corresponds to NAND-gate 64 of counter Z1, and the inverters are identified with reference numerals 72 and 73. The coding of counter Z2 with respect to the colors red, green, blue is the same as in counter Z1; accordingly, the output of NOR-gate 68 is connected with the second input of the corresponding NOR-gate 61, the output of NOR-gate 69 with the second input of the corresponding NOR-gate 62, and the output of NOR-gate 70 with the second input of the corresponding NOR-gate 63.

Figure 7:
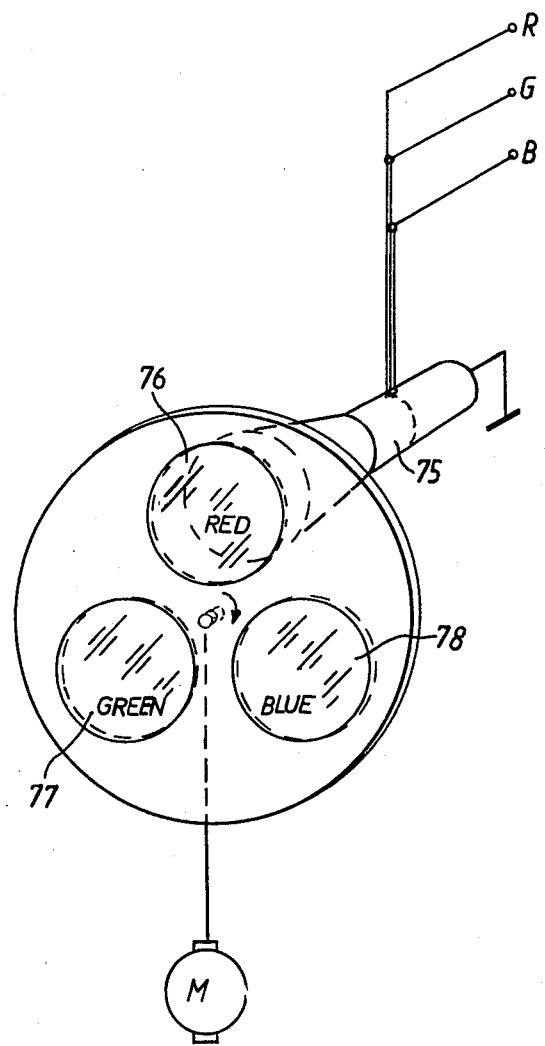

As shown in FIG. 6 and FIG. 7 this circuit arrangement assures that during the first image scan only the red signals are supplied to a black-white video tube 75, after the second scan only the green signals and after the third scan only the blue signals. In synchronism with the image frequency, a red filter 76, a green filter 77 and a blue filter 78 are sequentially moved in front of the black-white video tube 75.

One of the important advantages of the invention resides in the fact that an electronic image of high resolution is produced with the aid of a high-resolution CCD-array and a deflecting system, preferably a swing-mirror system, and that the processing of the picture being reproduced is slow compared to video images, so that the threshold value of 5 MH$_Z$ known from television will not be exceeded.

Furthermore, due to the presence of the monitor and associated equipment the user can view the electronic (video) picture in a monitor which stores and makes visible almost half of the image points in line-wise form. It is sufficient if the contrast on the monitor is in the lower range, since this will be adequate to allow identification of the images being monitored and a decision as to whether the picture is to be copied. The contrast may even be worse than in normal TV images. The monitor enables a user to determine whether he wishes to copy any particular image and, if so, whether and in what manner the picture needs to be corrected.

While the invention has been illustrated and described as embodied in other types of applications, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus for electronically scanning optical images, including an optoelectronic converter device having an electronic circuit for linewise conversion of the scanned image into video signals, a device for recording on photosensitive paper image point signals from a video tube unit receiving the video signals and forming part of the device, and a monitor for screening of the video image produced by the video signals, the improvement wherein the opto-electronic converter device comprises a CCD-array including red-sensitive, green-sensitive and blue-sensitive photo diodes in a number assuring an image resolution which is higher than the resolution of video images; and further comprising an optical deflecting system for deflecting light rays from an optical image onto the CCD-array to reproduce the image linewise on the array at a first frequency which is much smaller than the video image frequency; shift register means connected with said CCD-array to receive image signals therefrom and including an oscillator which effects pulsed linewise transmission of the image signals out of the shift register means at a second frequency which is higher than said first frequency by a factor at least equal to the lines of a video image; signal processing means connected with said shift register means for receiving signals therefrom and converting them to video signals which are supplied to the video tube unit at the image point frequency; and electronic storage means for the monitor which skips at least every other image point and stores and screens at most every second image point on the monitor.

2. The apparatus as defined in claim 1, wherein said optical deflecting system is a mirror system.

3. The apparatus as defined in claim 1, wherein said video tube unit includes three color video tubes, one each for the colors red, green and blue, and respective gating circuits which simultaneously activate all three tubes for each image.

4. The apparatus as defined in claim 1, wherein said video tube unit includes a single black-white video tube, a red filter, a green filter and a blue filter which for the duration of and synchronously with each picture scan are sequentially moved in front of the video tube, and a time-demultiplexer which is clocked at the picture-scan rate and operative for separating the red, green and blue image signals.

5. The apparatus as defined in claim 1; and further comprising image point signal storing means connected with said shift register means and operative for receiving the image point signals therefrom line-by-line and for discharging the stored signals similarly line-by-line, said storing means having a separate input and output channel for each of the red, green and blue color signals.

6. The apparatus as defined in claim 1; and further comprising phase inverting means operatively connected with said shift register means to permit video reproduction and, if desired, copying onto the photosensitive paper, of negative optical images.

7. The apparatus as defined in claim 6, said phase inverting means comprising inverter stages.

8. The apparatus as defined in claim 1; further comprising a γ-balancing stage and a crispening stage, both in circuit with and arranged subsequent to said CCD-array, for contrast correction and for increasing the flank pitch of the transmission signals, respectively.

9. The apparatus as defined in claim 1; further comprising a light source for illuminating the optical image, an adjustable diaphragm interposed between the light source and the optical image to vary the quantity of light reaching the same; and means for adjusting said diaphragm, including a black-level detector, a red-green-blue matrix connecting said CCD-array with said detector, a DC motor coupled with said diaphragm for adjusting the same, and a reference amplifier in circuit with said detector and motor for controlling the latter as a function of signals received from the detector.

10. The apparatus as defined in claim 9, said reference amplifier having an output; and further comprising a logic element connected with said output, and a gating arrangement connected with said logic element and with said video tube unit, the video tube unit being energized for a predetermined time period via said logic element and gating arrangement when a starting signal is given.

11. The apparatus as defined in claim 10, said video tube unit having a single black-white video tube, a red filter, a green filter and a blue filter which for the duration of and synchronously with each picture scan are sequentially moved in front of the video tube; further comprising a digital counter having a clocking input and three outputs; a clocking oscillator having a frequency equal to said first frequency; and three gating stages each operatively connecting one of the outputs of said counter with one of three channels which respectively transmit red, green and blue color signals to said video tube, for sequential transmission of such red, green and blue color signals for each video image on said video tube.

12. The apparatus as defined in claim 11, said counter being a 2-bit digital counter having a first and a second output, a reset input and a counting input; said gating stages being NOR-gates each having a first, second and third input, said first output of said counter being directly connected with the first inputs of the first and third ones of said NOR-gates and being connected via an inverter with the first input of the second one of said NOR-gates, the second output of said counter being directly connected with the third inputs of said first and second NOR-gates and being connected via an inverter with the third input of said third NOR-gate; further comprising a NAND-gate connected with said first and second outputs of said counter and with said resetting input thereof, said counting input of said counter being connected to said oscillator; and further comprising an electronic unit including a further 2-bit digital counter, further gating stages with NOR-gates, a further NAND-gate and a further oscillator all connected in the same manner as set forth above for the respective first-mentioned counter, gating stage, NAND-gate and oscillator, the third inputs of the NOR-gates of said further gating stages each being connected with an output of a corresponding first-mentioned NOR-gate.

* * * * *